(12) United States Patent
Iguchi

(10) Patent No.: US 11,592,459 B2
(45) Date of Patent: Feb. 28, 2023

(54) COLLISION DETERMINATION DEVICE

(71) Applicant: DENSO CORPORATION, Kariya (JP)

(72) Inventor: Yuki Iguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 978 days.

(21) Appl. No.: 16/356,147

(22) Filed: Mar. 18, 2019

(65) Prior Publication Data

US 2019/0293679 A1 Sep. 26, 2019

(30) Foreign Application Priority Data

Mar. 20, 2018 (JP) .............................. JP2018-053030

(51) Int. Cl.
*G01P 15/18* (2013.01)
*B60R 21/0132* (2006.01)
*B60R 21/00* (2006.01)

(52) U.S. Cl.
CPC .......... *G01P 15/18* (2013.01); *B60R 21/0132* (2013.01); *B60R 2021/0004* (2013.01); *B60R 2021/0023* (2013.01); *B60R 2021/0025* (2013.01)

(58) Field of Classification Search
CPC ................ G01P 15/18; B60R 21/0132; B60R 2021/0004; B60R 2021/0023; B60R 2021/0025

USPC ......................................................... 702/141
See application file for complete search history.

(56) References Cited

U.S. PATENT DOCUMENTS

| 6,327,527 B1 * | 12/2001 | Imai ..................... B60R 21/013 701/45 |
| 2003/0074111 A1 | 4/2003 | Ugusa et al. |
| 2005/0165530 A1 | 7/2005 | Higuchi et al. |
| 2013/0304289 A1 | 11/2013 | Suzuki |
| 2017/0232919 A1 | 8/2017 | Miyata et al. |

FOREIGN PATENT DOCUMENTS

| JP | 2001-247004 A | 9/2001 |
| JP | 2006-160066 A | 6/2006 |
| JP | 3819274 B2 | 9/2006 |
| JP | 2017-105232 A | 6/2017 |
| JP | 2017-144747 A | 8/2017 |

* cited by examiner

*Primary Examiner* — Melissa J Koval
*Assistant Examiner* — Byung Ro Lee
(74) *Attorney, Agent, or Firm* — Maschoff Brennan

(57) ABSTRACT

In a collision determination device for determining a type of front collision of a vehicle, a collision determination unit is configured to determine that the collision type is full overlap front collision as collision of the vehicle with an obstacle across substantially the entire width of a front surface of a vehicle body in a case where initial values as values at an early phase of the collision for a first lateral acceleration and a second lateral acceleration are both less than a full overlap determination threshold as a negative value.

13 Claims, 7 Drawing Sheets

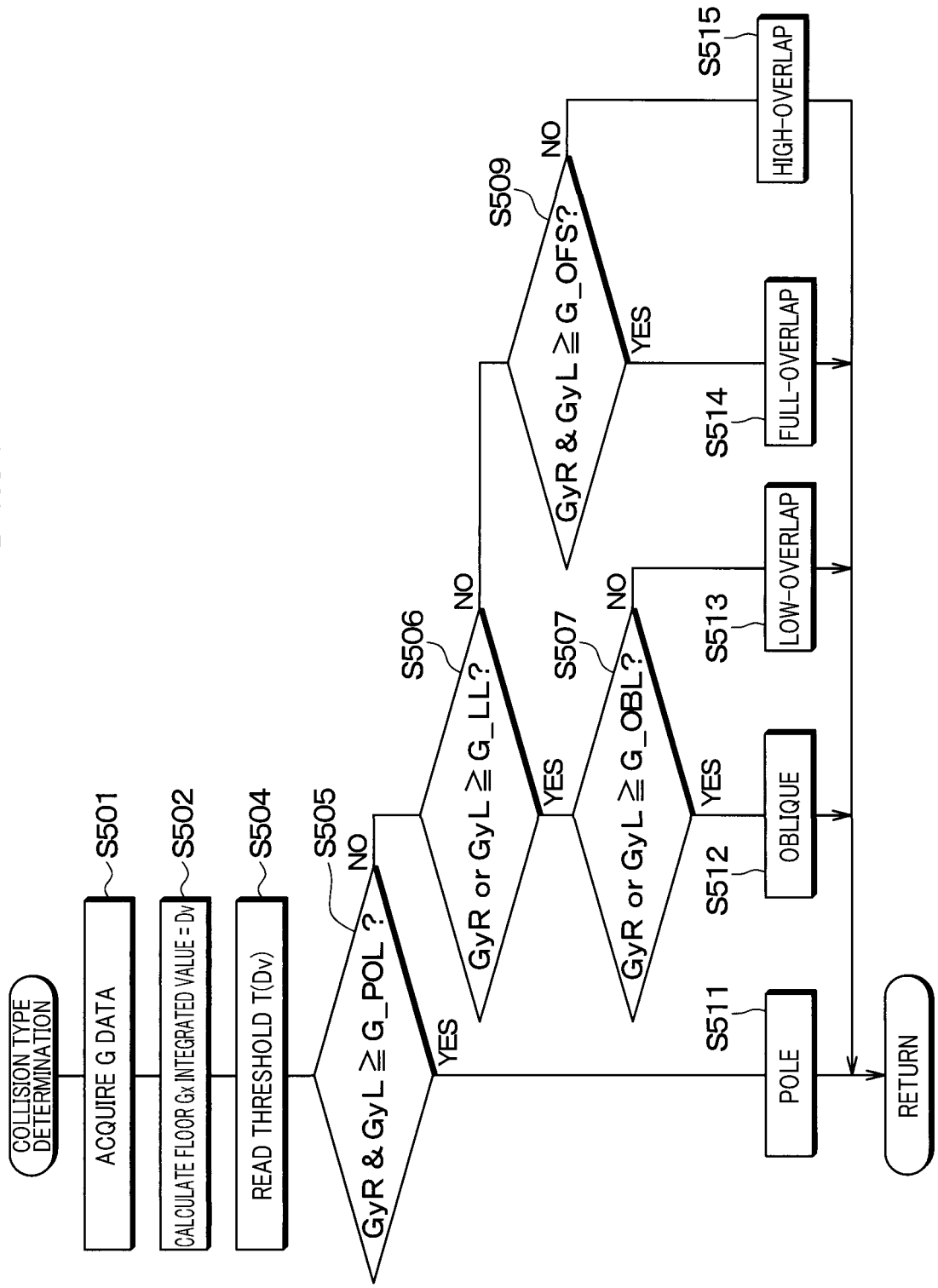

COLLISION DETERMINATION DEVICE

CROSS-REFERENCE TO RELATED APPLICATION

This application is based on and claims the benefit of priority from earlier Japanese Patent Application No. 2018-53030 filed Mar. 20, 2018, the description of which is incorporated herein by reference.

BACKGROUND

Technical Field

The present invention relates to a collision determination device configured to determine a type of front collision of a vehicle.

Related Art

A device described in JP 2006-160066 A has been known as the device of this type. The device described in JP 2006-160066 A has acceleration detection sections, right and left curtain airbags, and an airbag deployment control section. The acceleration detection section is arranged on each of right and left front sides of a vehicle to detect a front-to-rear acceleration (i.e., an acceleration in a front-to-rear direction) on each of right and left sides. The airbag deployment control section is configured to make determination as an offset collision in a case where a difference between the right and left front-to-rear accelerations detected by the acceleration detection sections is equal to or greater than a predetermined value, thereby causing one of the right and left curtain airbags on a side with a higher front-to-rear acceleration to deploy.

Specifically, the device described in JP 2006-160066 A causes the curtain airbag on the side corresponding to one acceleration detection section to deploy under a condition where the front-to-rear acceleration detected by either one of the right and left acceleration detection sections reaches equal to or higher than a predetermined reference value. Further, this device is configured to make determination as a head-on collision when the front-to-rear acceleration detected by the other acceleration detection section also reaches equal to or higher than the predetermined reference value, thereby causing an airbag of a driver seat or a passenger seat to deploy.

There are various types of front collision of a vehicle. There is a need for a collision determination device that can quickly and accurately determine a collision type.

SUMMARY

One aspect of the present disclosure provides a collision determination device for determining a type of front collision of a vehicle. In the collision determination device, a collision determination unit is configured to determine that the collision type is a full overlap front collision as collision of the vehicle with an obstacle across substantially the entire width of a front surface of a vehicle body in a case where initial values as values at an early phase of the collision for a first lateral acceleration and a second lateral acceleration are both less than a full overlap determination threshold as a negative value.

Another aspect of the present disclosure provides a collision determination device for determining a type of front collision of a vehicle. In this collision determination device, a collision determination unit is configured to determine that the collision type is a full overlap front collision as collision of the vehicle with an obstacle across substantially the entire width of a front surface of a vehicle body in a case where initial values as values at an early phase of the collision for a first lateral acceleration and a second lateral acceleration are both less than a low overlap determination threshold as a positive value and an initial value of first longitudinal deceleration and an initial value of second longitudinal deceleration are both equal to or greater than an offset determination threshold as a positive value.

BRIEF DESCRIPTION OF THE DRAWINGS

In the accompanying drawings:

FIG. 6 is a flowchart for describing another example operation of the collision determination device illustrated in FIG. 2.

DESCRIPTION OF SPECIFIC EMBODIMENTS

Figure 1:
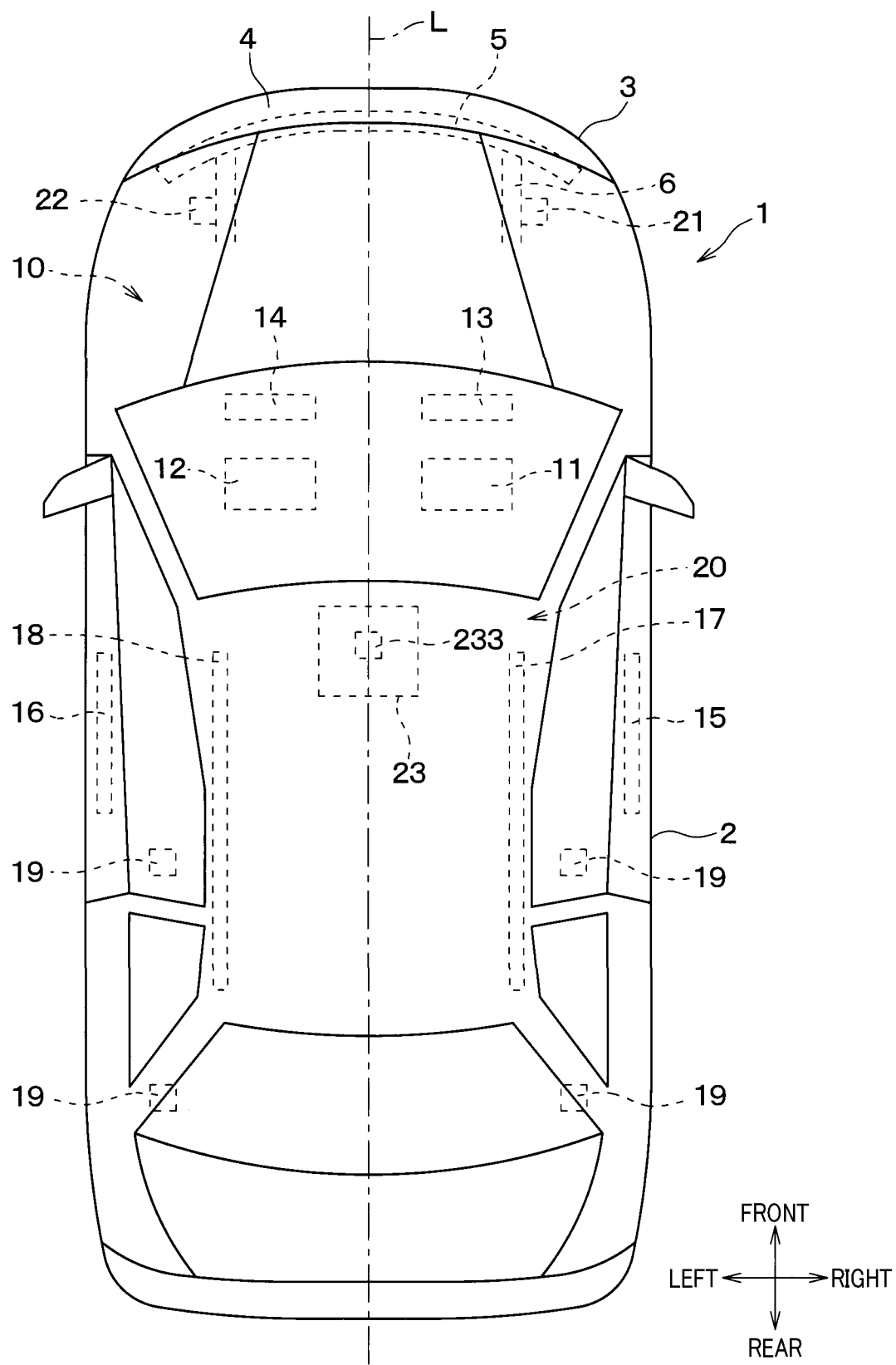
FIG. 1 is a plan view of an outline configuration of a vehicle to which one embodiment of the present invention is applied.

Hereinafter, an embodiment of the present invention will be described with reference to the drawings. Note that variations of embodiments will be described after the main description of the embodiment itself, to avoid impairing the clarity of the description.

Outline Configuration of Vehicle

First, an outline configuration of a vehicle 1 as a target for application of the present invention will be described with reference to FIG. 1. The concepts of "front," "rear," "left," and "right" in the vehicle 1 are as indicated by arrows in FIG. 1 etc.

Note that a front-to-rear or longitudinal direction parallel with a vehicle center line L will be referred to as an "vehicle length direction," and a right-to-left or lateral direction perpendicular to such a direction will be referred to as a "vehicle width direction" in some cases. Moreover, a direction perpendicular to the vehicle length direction and the vehicle width direction, i.e., an upper-to-lower direction, will be referred to as a "vehicle height direction" in some cases. The vehicle height direction is substantially parallel with a gravity action direction in a state in which the vehicle 1 is placed on the substantially horizontal ground. Moreover, a view of the vehicle 1 from above along the vehicle height direction will be referred to as a "plan view," and a view of the vehicle 1 from the front along the vehicle length direction will be referred to as a "front view."

The vehicle 1 is a so-called automobile, and has a box-shaped vehicle body 2. A front bumper 4 is attached to a front surface 3 of the vehicle body 2. A reinforcement member 5 called a "bumper reinforcement" is arranged inside the front bumper 4. The reinforcement member 5 is a bar-shaped member extending in the vehicle width direction in front view, and in the present embodiment, is formed to curve in a partial arc shape raised forward in plan view. The reinforcement member 5 is fixed to a front end portion of a pair of side members 6 extending forward. In the present embodiment, each of the side members 6 in a pair extends substantially parallel with the vehicle length direction. Note that as described later, the geometry of the reinforcement member 5 and the side members 6 is not limited to that of the above-described specific example. Variations of the geometry of the reinforcement member 5 and the side members 6 will be described later.

A passenger protection system 10 is mounted on the vehicle 1. The passenger protection system 10 is configured to protect a passenger of the vehicle 1 in the case of a collision between the vehicle 1 and an object (e.g., other vehicles, a wall, and a pole) present outside the vehicle 1.

Specifically, in the present embodiment, the passenger protection system 10 includes a driver seat front airbag 11, a passenger seat front airbag 12, a driver seat knee airbag 13, a passenger seat knee airbag 14, a driver seat side airbag 15, a passenger seat side airbag 16, a driver seat curtain airbag 17, a passenger seat curtain airbag 18, belt tensioning mechanisms 19, and a protection control device 20. Note that the driver seat front airbag 11, the passenger seat front airbag 12, the driver seat knee airbag 13, the passenger seat knee airbag 14, the driver seat side airbag 15, the passenger seat side airbag 16, the driver seat curtain airbag 17, the passenger seat curtain airbag 18, and the belt tensioning mechanisms 19 will be collectively referred to as a "protection device" in some cases.

The driver seat front airbag 11 is provided to deploy in front of the upper body of a passenger seating on a driver seat. The passenger seat front airbag 12 is provided to deploy in front of the upper body of a passenger seating on a passenger seat.

The driver seat knee airbag 13 is provided to deploy in front of the knees of the passenger seating on the driver seat. The passenger seat knee airbag 14 is provided to deploy in front of the knees of the passenger seating on the passenger seat.

The driver seat side airbag 15 is provided to deploy at the side of the passenger seating on the driver seat. The passenger seat side airbag 16 is provided to deploy at the side of the passenger seating on the passenger seat.

The driver seat curtain airbag 17 is provided to deploy downward at the side of the passenger seating on the driver seat. The passenger seat curtain airbag 18 is provided to deploy downward at the side of the passenger seating on the passenger seat.

The belt tensioning mechanism 19 is provided corresponding to each seat to reel a seatbelt at each seat inside the vehicle 1. The belt tensioning mechanism 19 is a so-called belt pretensioner mechanism, and is configured to provide a tension of equal to or higher than a predetermined value to the seatbelt corresponding to each seat to restrain the passenger on the seat. The belt tensioning mechanism 19 has a well-known reversible or irreversible configuration.

Configuration of Protection Control Device

The protection control device 20 is configured to control operation of the passenger protection system 10. Specifically, the protection control device 20 includes a first acceleration sensor 21, a second acceleration sensor 22, and a protection control ECU 23. The ECU stands for an electronic control unit.

The first acceleration sensor 21 is arranged at a front portion of the vehicle 1 on one side in the vehicle width direction with respect to the vehicle center line L. Specifically, the first acceleration sensor 21 is fixed to a tip end side position of the right side member 6 with the first acceleration sensor 21 being arranged at a right front corner portion of the vehicle body 2.

The second acceleration sensor 22 is arranged at the front portion of the vehicle 1 on the other side in the vehicle width direction with respect to the vehicle center line L. Specifically, the second acceleration sensor 22 is fixed to a tip end side position of the left side member 6 with the second acceleration sensor 22 being arranged at a left front corner portion of the vehicle body 2. The first acceleration sensor 21 and the second acceleration sensor 22 are arranged bilaterally symmetrically with respect to the vehicle center line L.

The first acceleration sensor 21 and the second acceleration sensor 22 are so-called biaxial acceleration sensors, and are configured to generate electric output according to a deceleration in the vehicle length direction and an acceleration in the vehicle width direction. The first acceleration sensor 21 and the second acceleration sensor 22 are connected to the protection control ECU 23 so that signals can be exchanged with the protection control ECU 23 via a communication line such as an in-vehicle network.

The protection control ECU 23 is a so-called in-vehicle microcomputer, and includes a CPU (not-shown), a ROM (not-shown), a RAM (not-shown), and a non-volatile RAM (not-shown). The non-volatile RAM is, for example, a flash ROM. The CPU, the ROM, the RAM, and the non-volatile RAM of the protection control ECU 23 will be hereinafter simply abbreviated as a "CPU," a "ROM," a "RAM," and a "non-volatile RAM."

The protection control ECU 23 is configured such that the CPU reads programs from the ROM or the non-volatile RAM and executes these programs to implement various types of control operation. Moreover, in the ROM or the non-volatile RAM, various types of data used upon execution of the programs are stored in advance. Various types of data include, for example, an initial value, a look-up table, and a map. The RAM is provided to temporarily store, e.g., an arithmetic result and data input from the outside when the CPU executes the programs. Details of a functional configuration of the protection control ECU 23 will be described later.

The protection control ECU 23 is configured to sense collision between the vehicle 1 and the object based on the output of the first acceleration sensor 21 and the second acceleration sensor 22 and sense severity and a collision type in a case where the collision has sensed. The "severity" is an indication of the degree of collision. The severity can be determined at three levels of mild, moderate, and severe as in, e.g., Japanese Patent No. 5,772,712 and associated U.S. Pat. No. 8,983,698. Moreover, the protection control ECU 23 is configured to operate the protection device according to the severity and the collision type in a case where the collision, the severity, and the collision type have been sensed. That is, in the present embodiment, the passenger protection system 10 is configured to be driven in a stepwise manner according to the severity as in, e.g., Japanese Patent No. 4,168,944 and associated U.S. Pat. No. 7,606,646.

Functional Configuration of Protection Control ECU

The protection control ECU 23 includes a collision determination device 230 as a functional configuration implemented on the microcomputer. The collision determination device 230 is configured to determine the collision type upon front collision of the vehicle 1. Specifically, the collision determination device 230 includes a first acceleration acquiring unit 231, a second acceleration acquiring unit 232, a third acceleration acquiring unit 233, an integrated value calculation unit 234, a threshold storage unit 235, and a collision determination unit 236.

The first acceleration acquiring unit 231 is provided to acquire a first longitudinal deceleration and a first lateral acceleration based on the output of the first acceleration sensor 21. The first longitudinal deceleration is a deceleration in the vehicle length direction parallel with the vehicle center line L. That is, the first longitudinal deceleration is an acceleration in a backward direction. Thus, for the first longitudinal deceleration, the acceleration in the backward direction is taken as a positive value, and an acceleration in a forward direction is taken as a negative value. The first lateral acceleration is an acceleration in the vehicle width direction. For the first lateral acceleration, an acceleration in an inward direction toward the vehicle center line L is taken as a positive value, and an acceleration in an outward direction opposite to the inward direction is taken as a negative value. The first acceleration acquiring unit 231 may be configured as a built-in memory of the CPU or a storage area on the RAM.

The second acceleration acquiring unit 232 is provided to acquire a second longitudinal deceleration and a second lateral acceleration based on the output of the second acceleration sensor 22. The second longitudinal deceleration is the deceleration in the vehicle length direction. Thus, for the second longitudinal deceleration, the acceleration in the backward direction is also taken as the positive value, and the acceleration in the forward direction is also taken as the negative value. The second lateral acceleration is the acceleration in the vehicle width direction. For the second longitudinal deceleration, the acceleration in the inward direction is taken as the positive value, and the acceleration in the outward direction is taken as the negative value. The second acceleration acquiring unit 232 may be configured as the built-in memory of the CPU or the storage area on the RAM.

The third acceleration acquiring unit 233 is provided to acquire a third longitudinal deceleration. The third longitudinal deceleration is the deceleration in the vehicle length direction. Thus, for the third longitudinal deceleration, the acceleration in the backward direction is also taken as the positive value, and the acceleration in the forward direction is also taken as the negative value. In the present embodiment, the third acceleration acquiring unit 233 is a so-called floor G sensor, and is built in a housing of the protection control ECU 23.

The integrated value calculation unit 234 is provided to calculate an integrated value of the third longitudinal deceleration. The threshold storage unit 235 is configured to store a threshold for estimation of the collision type. In the present embodiment, the threshold for estimation of the collision type is set to change according to the integrated value of the third longitudinal deceleration. That is, the threshold storage unit 235 stores a threshold map using the integrated value of the third longitudinal deceleration as a parameter. Details of the threshold (e.g., an oblique determination threshold) for estimation of the collision type will be described later.

The collision determination unit 236 is provided to determine the collision type based on the first longitudinal deceleration and the first lateral acceleration acquired by the first acceleration acquiring unit 231 and the second longitudinal deceleration and the second lateral acceleration acquired by the second acceleration acquiring unit 232. That is, the collision determination unit 236 reads the threshold from the threshold map based on the integrated value of the third longitudinal deceleration and compares the acquired longitudinal decelerations and the acquired lateral accelerations with the threshold, thereby determining the collision type.

Operation Outline

Hereinafter, operation outline of the collision determination device 230 according to the present embodiment will be described.

The first acceleration acquiring unit 231 acquires the first longitudinal deceleration and the first lateral acceleration based on the output of the first acceleration sensor 21. The second acceleration acquiring unit 232 acquires the second longitudinal deceleration and the second lateral acceleration based on the output of the second acceleration sensor 22. The third acceleration acquiring unit 233 acquires the third longitudinal deceleration.

The integrated value calculation unit 234 calculates the integrated value of the third longitudinal deceleration. The collision determination unit 236 reads the threshold from the threshold map stored in the threshold storage unit 235 based on the integrated value of the third longitudinal deceleration calculated by the integrated value calculation unit 234. The collision determination unit 236 compares the lateral accelerations acquired by the first acceleration acquiring unit 231 and the second acceleration acquiring unit 232 with the corresponding thresholds. The collision determination unit 236 compares the longitudinal decelerations acquired by the first acceleration acquiring unit 231 and the second acceleration acquiring unit 232 with the corresponding thresholds. The collision determination unit 236 determines the collision type upon the front collision based on these comparison results.

Figure 3:
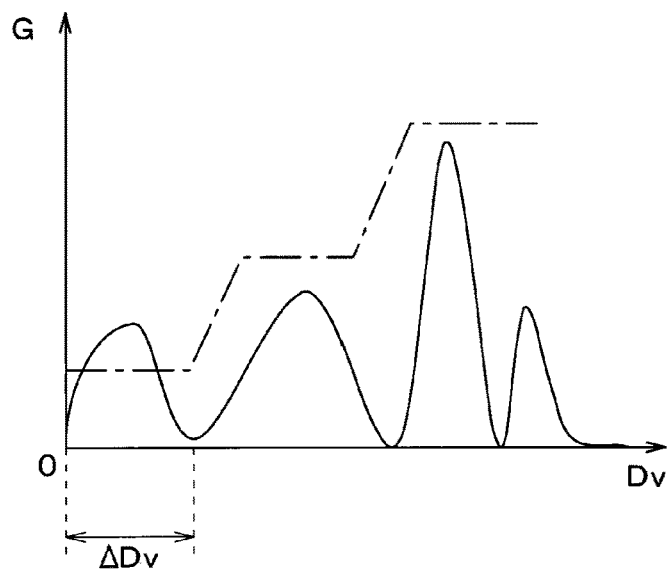
FIG. 3 is a graph for describing an example operation of a collision determination device illustrated in FIG. 2.

FIG. 3 is a graph of the outline of collision determination by the collision determination unit 236. In FIG. 3, a horizontal axis Dv as a "first axis" indicates the integrated value of the third longitudinal deceleration. Moreover, a vertical axis G as a "second axis" indicates the acceleration, i.e., the longitudinal deceleration or the lateral acceleration. A curve indicated by a solid line in the graph indicates an acquired value of the first longitudinal deceleration, the first lateral acceleration, the second longitudinal deceleration, or the second lateral acceleration. A polygonal line indicated by a chain line in the graph indicates the threshold read from the threshold map.

As illustrated in FIG. 3, the acquired value of the longitudinal deceleration or the lateral acceleration is represented using the horizontal axis Dv and the vertical axis G, and therefore, the waveform of the longitudinal deceleration or the lateral acceleration at an early phase of the collision can be arranged on the left side in the graph. Thus, in a case where the integrated value of the third longitudinal deceleration is represented at the horizontal axis and any one value of the first longitudinal deceleration, the first lateral acceleration, the second longitudinal deceleration, or the second lateral acceleration is represented at the vertical axis, the collision determination unit 236 determines the collision type based on the threshold varying according to the value of the horizontal axis and the value of the vertical axis.

That is, the collision determination unit 236 compares an "initial value" as the value of the longitudinal deceleration or the lateral acceleration at the early phase of the collision with the threshold, thereby determining the collision type. Specifically, in the present embodiment, the collision determination unit 236 determines the collision type based on whether the acquired value of the longitudinal deceleration or the lateral acceleration in a horizontal axis Dv value of 0 to a predetermined value ΔDv is equal to or greater than the threshold or not. With this configuration, the value of the longitudinal deceleration or the lateral acceleration at the early phase of the collision can be favorably separated from a value at a later phase of the collision and be used for determination of the collision type.

FIGS. 4A to 4E illustrate representative examples of the collision type upon the front collision. As illustrated in FIGS. 4A to 4E, the "front collision" is collision of an obstacle B with the front surface 3, typically the front bumper 4, of the vehicle body 2 of the vehicle 1. The obstacle B is, for example, an architectural building such as a wall or other vehicle. Note that in FIGS. 4A to 4E, the positive value of the acceleration or the deceleration is indicated by a black thick arrow, and the negative value of the acceleration or the deceleration is indicated by a white arrow.

Figure 4A:
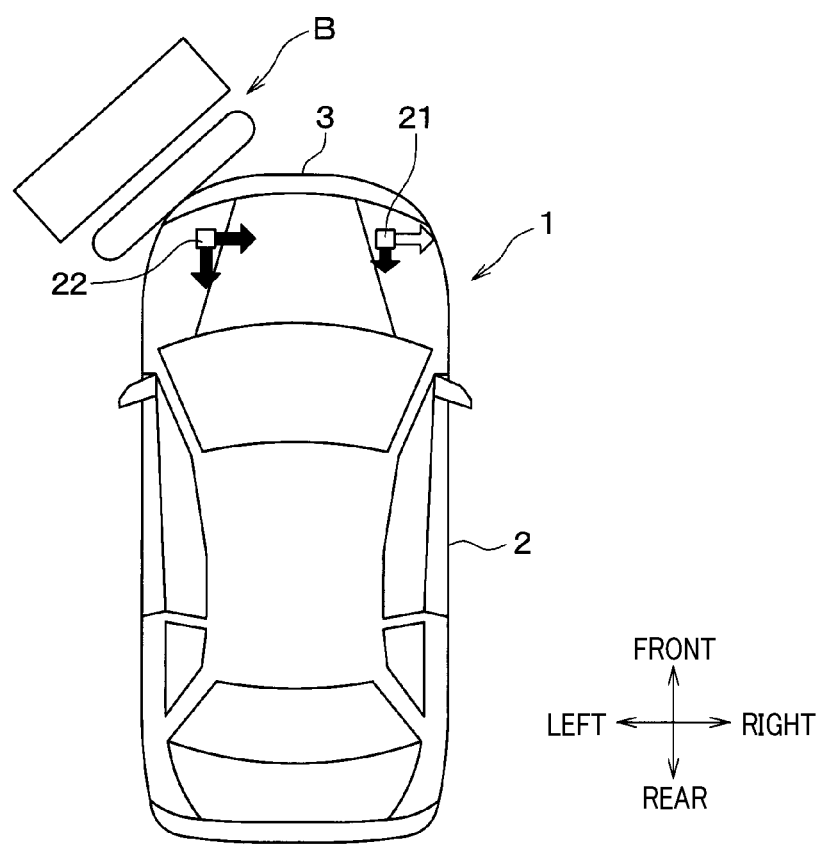
FIG. 4A is a plan view for describing a type of front collision of the vehicle.

FIG. 4A illustrates an oblique front collision. The oblique front collision is front collision of the corner portion of the front surface 3 of the vehicle body 2 with an inclined surface of the obstacle B, the inclined surface standing with inclination with respect to the vehicle width direction in plan view. The oblique front collision will be also referred to as "oblique impact."

In FIG. 4A, a collision type with an overlap ratio of about 35% at a relative angle of about 15° according to test conditions in an oblique collision test defined by the NHTSA is illustrated as a typical example of the oblique front collision. The NHTSA stands for the National Highway Traffic Safety Administration. The overlap ratio is the rate of the dimension of a collision region in the vehicle width direction to a vehicle width, the collision region being a region of the vehicle body 2 colliding with the obstacle B. The vehicle width is the dimension of the vehicle body 2 in the vehicle width direction. Note that in the oblique front collision, collision at a relative speed of 90 km/h is assumed.

As illustrated in FIG. 4A, in the oblique front collision, a high lateral acceleration in a positive direction is applied to the second acceleration sensor 22 on a collision side. On the other hand, a high lateral acceleration in a negative direction is applied to the first acceleration sensor 21 on the opposite side. That is, the acceleration and the deceleration applied to the first acceleration sensor 21 and the acceleration and the deceleration applied to the second acceleration sensor 22 are asymmetric.

Thus, the collision determination unit 236 compares a magnitude relationship between the initial value of the first lateral acceleration and an oblique determination threshold as a positive value. The "magnitude relationship" is a relationship between two values including not only an absolute value but also a sign. That is, one of two values closer to "+∞" is a "greater" value. The same also applies to subsequent comparison in the magnitude relationship. Moreover, the collision determination unit 236 compares a magnitude relationship between the initial value of the second lateral acceleration and the oblique determination threshold. Further, in a case where only either one of the initial value of the first lateral acceleration or the initial value of the second lateral acceleration is equal to or greater than the oblique determination threshold, the collision determination unit 236 determines that the collision type is the oblique front collision.

Figure 4B:
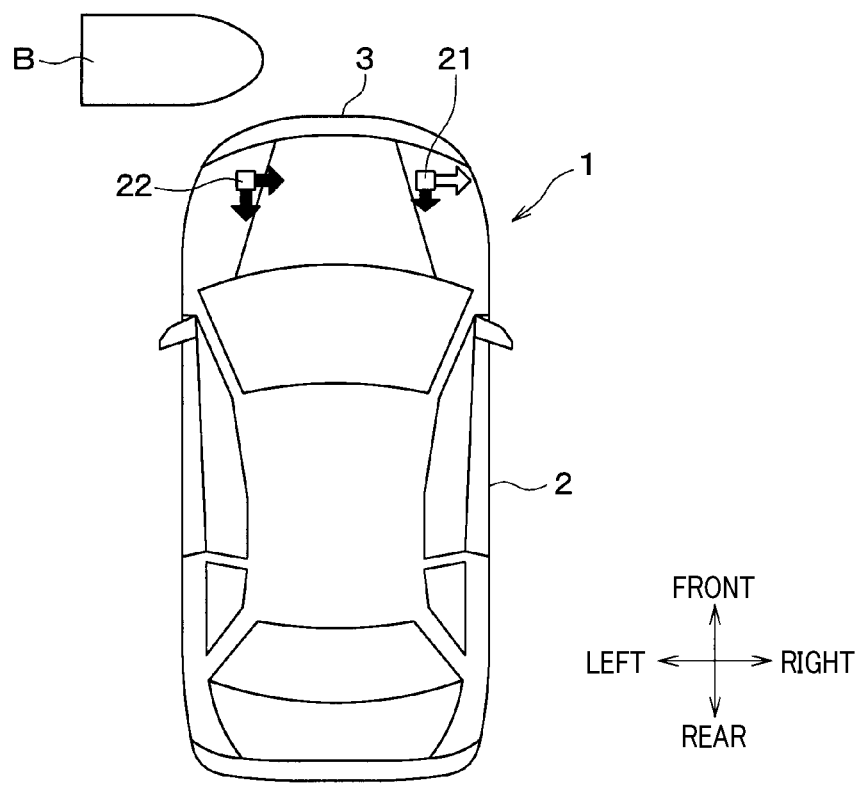
FIG. 4B is a plan view for describing the type of front collision of the vehicle.
Figure 4C:
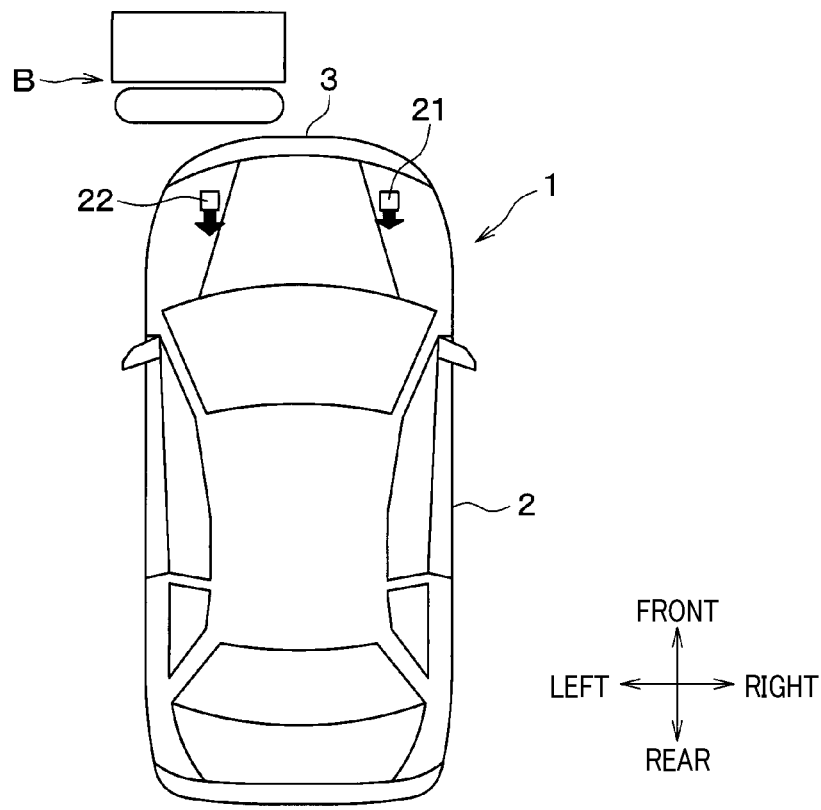
FIG. 4C is a plan view for describing the type of front collision of the vehicle.

FIGS. 4B and 4C illustrate an offset front collision. The offset front collision is a collision type upon front collision of a one-end-side region of the front surface 3 of the vehicle body 2 in the vehicle width direction with the obstacle B. That is, the offset front collision is a front collision with an overlap ratio of equal to or lower than a predetermined value (e.g., 75%).

FIG. 4B illustrates an offset front collision in the case of an overlap ratio of about 25% corresponding to a test condition in a small overlap front collision test according to the IIHS. IIHS stands for the Insurance Institute for Highway Safety. On the other hand, FIG. 4C illustrates the case of an overlap ratio of about 40% corresponding to a test condition in an offset front collision test according to the JNCAP. JNCAP stands for the Japan New Car Assessment Program.

In the present specification, an offset front collision with a relatively-low overlap ratio as illustrated in FIG. 4B will be referred to as a "low overlap front collision." The range of the overlap ratio in the low overlap front collision is, for example, 10 to 30%. Note that in the low overlap front collision, collision at a relative speed of 64 km/h is assumed. In a case where the overlap ratio is lower than the lower limit (e.g., 10% in the above-described example) of the overlap ratio range in the low overlap front collision, the form of impact received by the vehicle body 2 is substantially similar to that in the oblique front collision illustrated in FIG. 4A. Thus, this case can be taken as the oblique front collision.

On the other hand, an offset front collision with a relatively-high overlap ratio as illustrated in FIG. 4C will be referred to as a "high overlap front collision." The range of the overlap ratio in the high overlap front collision is, for example, 30 to 75%. In a case where the overlap ratio exceeds the upper limit (e.g., 75% in the above-described example) of the overlap ratio range in the high overlap front collision, the form of impact received by the vehicle body 2 is substantially similar to that in later-described full overlap front collision. Thus, this case can be taken as the full overlap front collision.

As illustrated in FIG. 4B, in the case of the low overlap front collision, a high lateral acceleration in the positive direction is applied to the second acceleration sensor 22 on the collision side. On the other hand, a high lateral acceleration in the negative direction is applied to the first acceleration sensor 21 on the opposite side. That is, the form of impact received by the vehicle body 2 in the low overlap front collision is similar to that in the oblique front collision. Note that an absolute value of the generated lateral acceleration is greater in the oblique front collision than in the low overlap front collision. Specifically, the lateral acceleration generated on the collision side is higher in the oblique front collision than in the low overlap front collision.

Thus, the collision determination unit 236 compares a magnitude relationship of the initial value of the first lateral acceleration with the oblique determination threshold and a low overlap determination threshold. The low overlap determination threshold is a positive value as in the oblique determination threshold, and an absolute value thereof is less than that of the oblique determination threshold. Moreover, the collision determination unit 236 compares a magnitude relationship of the initial value of the second lateral acceleration with the oblique determination threshold and the low overlap determination threshold. Further, the collision determination unit 236 determines the low overlap front collision as the collision type in a case where only one of the initial value of the first lateral acceleration or the initial value of the second lateral acceleration is equal to or greater than the low overlap determination threshold and is less than the oblique determination threshold.

As illustrated in FIG. 4C, in the case of the high overlap front collision, a great absolute value of the lateral acceleration as in the oblique front collision and the low overlap front collision is not generated in the case of the high overlap front collision. Moreover, the longitudinal deceleration is a smaller value in the case of the high overlap front collision than in the case of the oblique front collision and the low overlap front collision.

Thus, the collision determination unit 236 compares a magnitude relationship between the initial value of the first lateral acceleration and the low overlap determination threshold. Moreover, the collision determination unit 236 compares a magnitude relationship between the initial value of the second lateral acceleration and the low overlap determination threshold. Further, the collision determination unit 236 compares a magnitude relationship between the initial value of the first longitudinal deceleration and an offset determination threshold as a positive value. In addition, the collision determination unit 236 compares a magnitude relationship between the initial value of the second longitudinal deceleration and the offset determination threshold. Moreover, the collision determination unit 236 determines the high overlap front collision as the collision type in a case where the initial value of the first lateral acceleration and the initial value of the second lateral acceleration are both less than the low overlap determination threshold and either one of the initial value of the first longitudinal deceleration or the initial value of the second longitudinal deceleration is less than the offset determination threshold.

Figure 4D:
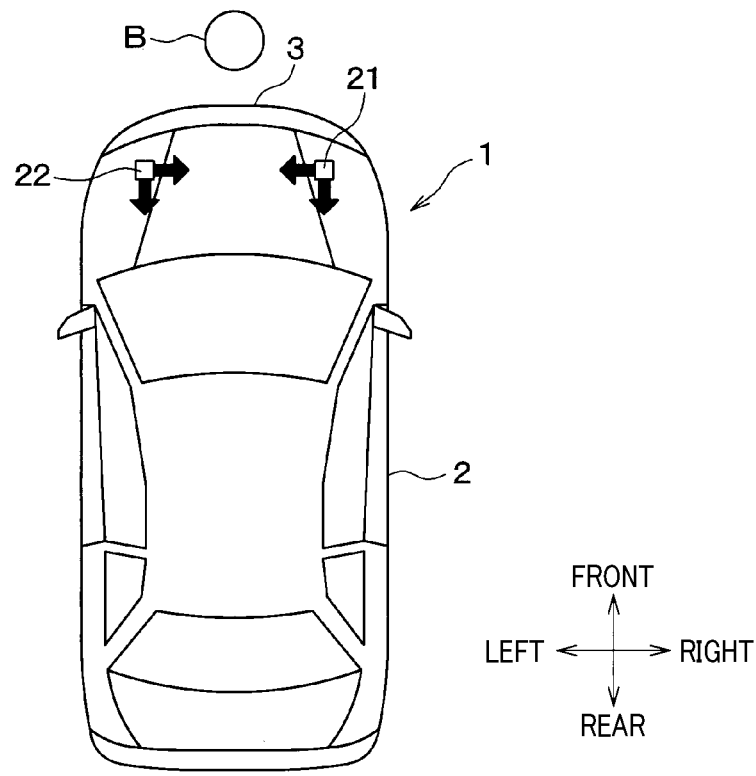
FIG. 4D is a plan view for describing the type of front collision of the vehicle.

FIG. 4D illustrates a pole collision. The pole collision is a front collision of the pole-shaped obstacle B with a middle portion of the front surface 3 of the vehicle body 2 in the vehicle width direction. The pole-shaped obstacle B extends in the vehicle height direction from a road surface or the ground, and has a sufficiently-smaller width dimension as a dimension in a direction perpendicular to an extension direction than the dimension of the vehicle body 2 in the vehicle width direction. The pole collision will be also referred to as "pole front collision."

In the case of the pole collision, the reinforcement member 5 curved forward in a raised shape before occurrence of the collision as illustrated in FIG. 1 is promptly bent at the early phase of the collision. Thus, as illustrated in FIG. 4D, the initial value of the first lateral acceleration and the initial value of the second lateral acceleration are both great positive values.

Thus, the collision determination unit 236 compares a magnitude relationship between the initial value of the first lateral acceleration and a pole determination threshold as a positive value. Moreover, the collision determination unit 236 compares a magnitude relationship between the initial value of the second lateral acceleration and the pole determination threshold. Further, the collision determination unit 236 determines the pole collision as the collision type in a case where the initial value of the first lateral acceleration and the initial value of the second lateral acceleration are both equal to or greater than the pole determination threshold. Note that the pole determination threshold is, for example, a value of equal to or greater than the low overlap determination threshold. Alternatively, the pole determination threshold is, for example, a value of equal to or less than the offset determination threshold.

Figure 4E:
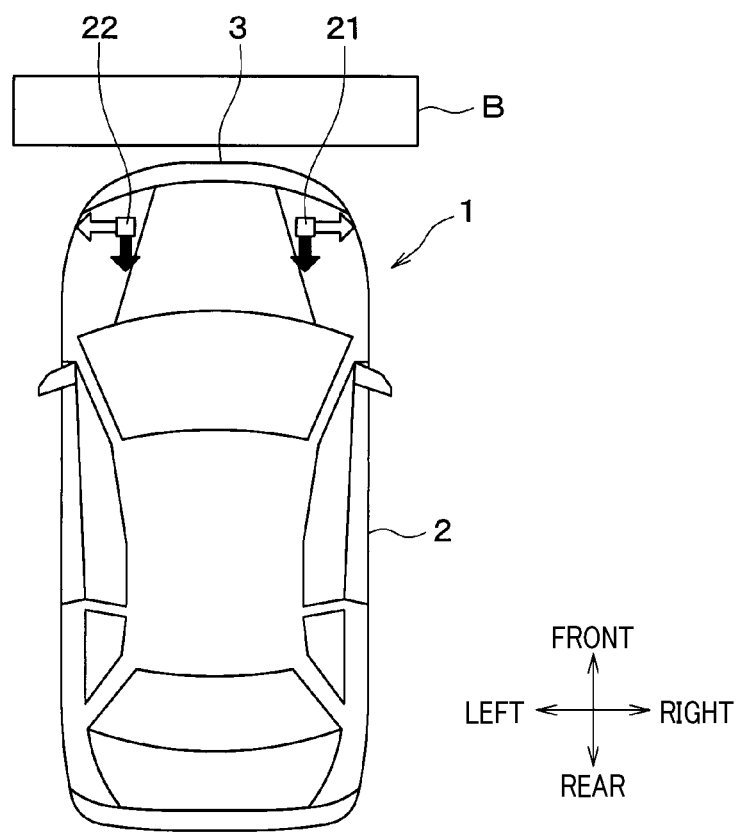
FIG. 4E is a plan view for describing the type of front collision of the vehicle.

FIG. 4E illustrates the full overlap front collision. The full overlap front collision is a collision type upon collision of the vehicle 1 with the obstacle B across substantially the entire width of the front surface 3 of the vehicle body 2, and will be also referred to as "head-on collision." That is, the full overlap front collision is front collision with an overlap ratio of about 100%.

In the collision types as illustrated in FIGS. 4A, 4B, and 4D, either one of the initial value of the first lateral acceleration or the initial value of the second lateral acceleration is a positive value whose absolute value is relatively great. Alternatively, in the collision type as illustrated in FIG. 4C, both of the initial value of the first lateral acceleration and the initial value of the second lateral acceleration are values whose absolute values are relatively small.

On the other hand, in the case of the full overlap front collision, the reinforcement member 5 curved forward in the raised shape before occurrence of the collision as illustrated in FIG. 1 is temporarily stretched right to left at the early phase of the collision. Thus, in the case of the full overlap front collision, the initial value of the first lateral acceleration and the initial value of the second lateral acceleration are great negative values whose absolute values are substantially similar to each other as illustrated in FIG. 4E. Moreover, the acceleration and the deceleration applied to the first acceleration sensor 21 and the acceleration and the deceleration applied to the second acceleration sensor 22 are substantially symmetric. On these points, the full overlap front collision has characteristics greatly different from those of other collision types as illustrated in FIGS. 4A to 4D.

Thus, the collision determination unit 236 compares a magnitude relationship between the initial value of the first lateral acceleration and a full overlap determination threshold as a negative value. Moreover, the collision determination unit 236 compares a magnitude value between the initial value of the second lateral acceleration and the full overlap determination threshold. Further, the collision determination unit 236 may determine the full overlap front collision as the collision type in a case where the initial value of the first lateral acceleration and the initial value of the second lateral acceleration are both less than the full overlap determination threshold. That is, in a case where the following two conditions are satisfied, full overlap front collision determination is satisfied: (F11) the initial value of the first lateral acceleration and the initial value of the second lateral acceleration are both negative values; and (F12) the absolute values of the initial value of the first lateral acceleration and the initial value of the second lateral acceleration are both greater than an absolute value of the full overlap determination threshold.

In the case of the full overlap front collision, the waveforms of the acceleration and the deceleration acquired based on the output of the first acceleration sensor 21 and the waveforms of the acceleration and the deceleration acquired based on the output of the second acceleration sensor 22 are substantially symmetric. Thus, the initial value of the first longitudinal deceleration and the initial value of the second longitudinal deceleration may be positive values whose absolute values are similar to each other, and may be values greater than those in the high overlap front collision.

Thus, the collision determination unit 236 may determine the full overlap front collision as the collision type in a case where the following two conditions are satisfied: (F21) the initial value of the first lateral acceleration and the initial value of the second lateral acceleration are both less than the low overlap determination threshold; and (F22) the initial value of the first longitudinal deceleration and the initial value of the second longitudinal deceleration are both equal to or greater than the offset determination threshold.

As described above, in the present embodiment, the collision determination unit 236 determines the collision type based on the magnitude relationship of the initial value of the first lateral acceleration and the initial value of the second lateral acceleration with the low overlap determination threshold, the oblique determination threshold, the full overlap determination threshold, and the pole determination threshold. Moreover, the collision determination unit 236 determines the collision type based on the magnitude relationship of the initial value of the first longitudinal deceleration and the initial value of the second longitudinal deceleration with the offset determination threshold. With this configuration, it can be more quickly and accurately determined whether the collision type of the front collision is the oblique front collision, the low overlap front collision, the high overlap front collision, the pole collision, or the full overlap front collision.

Example Operations

Hereinafter, a specific example operation of the collision determination device 230 according to the present embodiment will be described with reference to a flowchart of FIG. 5. Note that in the figure, a "step" is abbreviated as "S."

Figure 5:
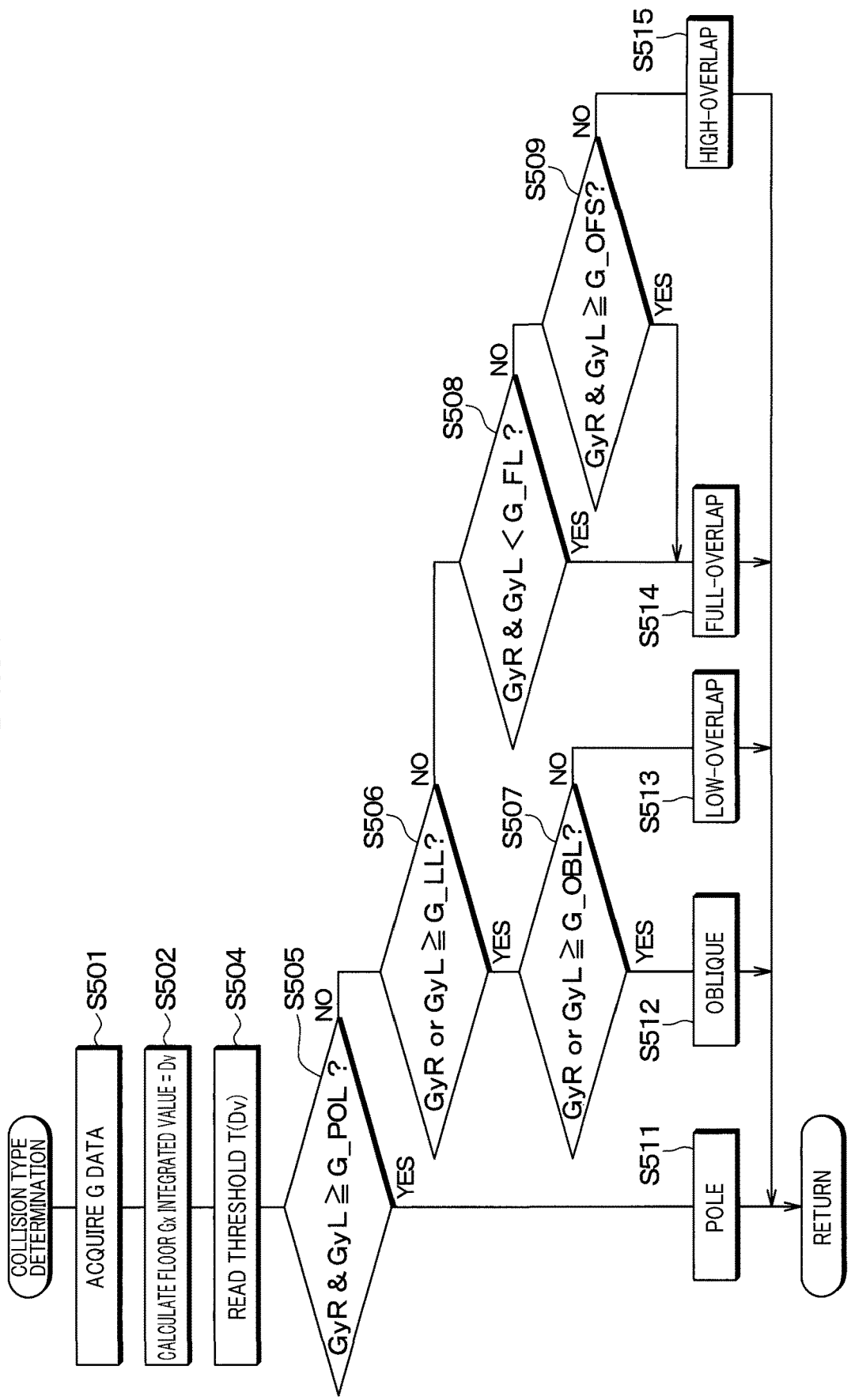
FIG. 5 is a flowchart for describing an example operation of the collision determination device illustrated in FIG. 2.

The CPU of the protection control ECU 23 executes a collision type determination routine illustrated in FIG. 5 in every lapse of predetermined time, taking the time point of turning on a not-shown ignition switch provided at the vehicle 1 as a beginning. Moreover, the CPU also executes, separately from the collision type determination routine illustrated in FIG. 5, a collision determination routine for determining whether the vehicle 1 has collided with the object outside the vehicle 1 and determining the severity in a case where the collision has occurred.

When the collision type determination routine illustrated in FIG. 5 is started, the CPU first acquires, at step 501, the first longitudinal deceleration, the first lateral acceleration, the second longitudinal deceleration, the second lateral acceleration, and the third longitudinal deceleration, and stores the acquired results in chronological order in the RAM. Next, at step 502, the CPU calculates the integrated value Dv of the third longitudinal deceleration, and stores the calculation results in chronological order in the RAM.

Subsequently, at step 504, the CPU reads, from the threshold storage unit 235, the low overlap determination threshold, the oblique determination threshold, the full overlap determination threshold, the pole determination threshold, and the offset determination threshold corresponding to the integrated value Dv in every lapse of the time. Moreover, the CPU determines the collision type by determination processing after step 505.

Specifically, at step 505, the CPU first determines whether the initial value of the first lateral acceleration GyR and the initial value of the second lateral acceleration GyL are both equal to or greater than the pole determination threshold G_POL as the positive value or not. In the case of "NO" in determination at step 505, the CPU proceeds to step 506.

At step 506, the CPU determines whether either one of the initial value of the first lateral acceleration GyR or the initial value of the second lateral acceleration GyL is equal to or greater than the low overlap determination threshold G_LL as the positive value or not. In the case of "YES" in determination at step 506, the CPU proceeds to step 507. On the other hand, in the case of "NO" in determination at step 506, the CPU proceeds to step 508.

At step 507, the CPU determines whether either one of the initial value of the first lateral acceleration GyR or the initial value of the second lateral acceleration GyL is equal to or greater than the oblique determination threshold G_OBL as the positive value or not. On the other hand, at step 508, the CPU determines whether the initial value of the first lateral acceleration GyR and the initial value of the second lateral acceleration GyL are both less than the full overlap determination threshold as the negative value or not.

In the case of "NO" in determination at step 508, the CPU proceeds to step 509. At step 509, the CPU determines whether the initial value of the first longitudinal deceleration GxR and the initial value of the second longitudinal deceleration GxL are both equal to or greater than the offset determination threshold G_OFS as the positive value or not.

There is a case where the initial value of the first lateral acceleration GyR and the initial value of the second lateral acceleration GyL are both equal to or greater than the pole determination threshold G_POL as the positive value. In this case, determination at step 505 is "YES." In this case, the CPU proceeds to step 511. At step 511, the CPU determines the pole collision as the collision type, and temporarily ends the present routine.

There is a case where only either one of the initial value of the first lateral acceleration GyR or the initial value of the second lateral acceleration GyL is equal to or greater than the oblique determination threshold G_OBL as the positive value. In this case, determination at step 505 is "NO," determination at step 506 is "YES," and determination at step 507 is "YES." In this case, the CPU proceeds to step 512. At step 512, the CPU determines the oblique front collision as the collision type, and temporarily ends the present routine.

There is a case where only one of the initial value of the first lateral acceleration GyR or the initial value of the second lateral acceleration GyL is equal to or greater than the low overlap determination threshold G_LL and less than the oblique determination threshold G_OBL. In this case, determination at step 505 is "NO," determination at step 506 is "YES," and determination at step 507 is "NO." In this case, the CPU proceeds to step 513. At step 513, the CPU determines the low overlap front collision as the collision type, and temporarily ends the present routine.

There is a case where the initial value of the first lateral acceleration GyR and the initial value of the second lateral acceleration GyL are both less than the full overlap determination G_FL threshold as the negative value. In this case, determination at step 505 is "NO," determination at step 506 is "NO," and determination at step 508 is "YES." In this case, the CPU proceeds to step 514. At step 514, the CPU determines the full overlap front collision as the collision type, and temporarily ends the present routine.

There is a case where the initial value of the first lateral acceleration GyR and the initial value of the second lateral acceleration GyL are both less than the low overlap determination threshold G_LL and the initial value of the first longitudinal deceleration GxR and the initial value of the second longitudinal deceleration GxL are both equal to or greater than the offset determination threshold G_OFF. In this case, determination at step 505 is "NO," determination at step 506 is "NO," determination at step 508 is "NO," and determination at step 509 is "YES." That is, even when either one of the initial value of the first lateral acceleration GyR or the initial value of the second lateral acceleration GyL is not less than the full overlap determination G_FL threshold as the negative value, determination at step 509 is "YES." In this case, the CPU also proceeds to step 514. At step 514, the CPU determines the full overlap front collision as the collision type, and temporarily ends the present routine.

There is a case where the initial value of the first lateral acceleration GyR and the initial value of the second lateral acceleration GyL are both less than the low overlap determination threshold G_LL and either one of the initial value of the first longitudinal deceleration GxR or the initial value of the second longitudinal deceleration GxL is less than the offset determination threshold G_OFF. In this case, determination at step 505 is "NO," and determination at step 506 is "NO." In this case, determination at step 508 is "NO," and determination at step 509 is "NO." In this case, the CPU proceeds to step 515. At step 515, the CPU determines the high overlap front collision as the collision type, and temporarily ends the present routine.

Variations

The present invention is not limited to the above-described embodiment. Thus, changes can be made to the above-described embodiment as necessary. Hereinafter, representative variations will be described. In description of the variations below, only differences from the above-described embodiment will be described. Moreover, the same reference numerals are used to represent the same or equivalent elements among the above-described embodiment and the variations. Thus, in description of the variations below, description of the above-described embodiment may be, as necessary, applicable regarding components with the same reference numerals as those of the above-described embodiment unless there are technical inconsistencies or special additional explanations.

The present invention is not limited to specific device configurations described in the above-described embodiment. For example, the geometry of the reinforcement member 5 and the side members 6 is not limited to that of the above-described specific example. That is, each of the side members 6 in a pair may extend, for example, with inclination with respect to the vehicle length direction such that an interval between the side members 6 in the vehicle width direction increases toward the front. In this case, the reinforcement member 5 may be formed to curve in a manner similar to that of the above-described specific example. Alternatively, the reinforcement member 5 may be formed in a straight bar shape substantially parallel with the vehicle width direction in front view and in plan view. The type, number, configuration, and arrangement of the protection device provided at the passenger protection system 10 are not specifically limited.

Figure 2:
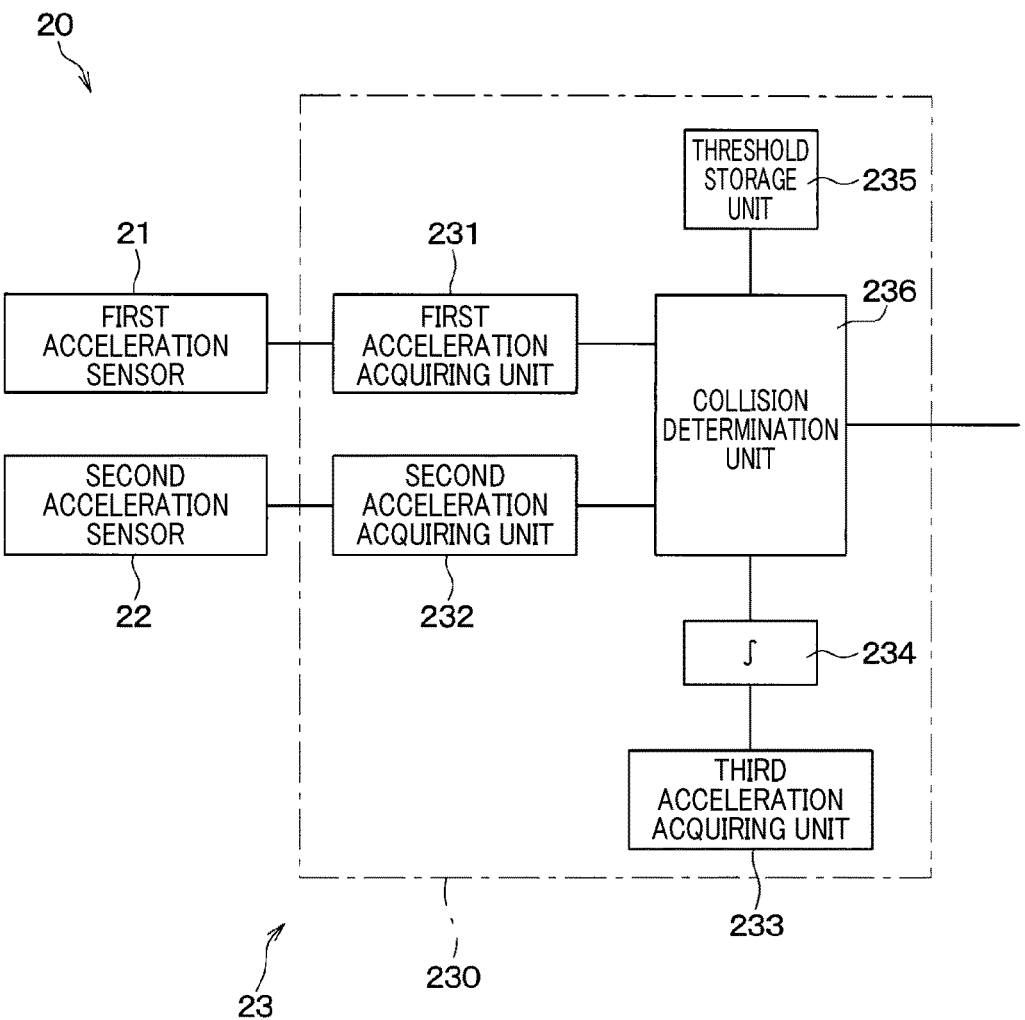
FIG. 2 is a block diagram of an outline functional configuration of a protection control device illustrated in FIG. 1.

When the first longitudinal deceleration, the first lateral acceleration, the second longitudinal deceleration, and the second lateral acceleration are acquired, e.g., filter processing for noise reduction is normally performed. A filter for such filter processing has been already present as a known technique at the time of filing the present application. Thus, such a filter is not shown in FIG. 2. Note that such a filter may be provided on a first acceleration sensor 21 side and a second acceleration sensor 22 side. Alternatively, such a filter may be provided on a first acceleration acquiring unit 231 side and a second acceleration acquiring unit 232 side.

The third acceleration acquiring unit 233 is not limited to the so-called floor G sensor. That is, the third acceleration acquiring unit 233 may be, for example, made common to at least any of the first acceleration acquiring unit 231 and the second acceleration acquiring unit 232.

The present invention is not limited to the specific example operation described in the above-described embodiment. For example, a start condition may be set for the collision type determination routine illustrated in FIG. 5.

This start condition may include a condition where the traveling speed of the vehicle 1 exceeds a predetermined value. No other specific limitations are imposed on the timing of starting the collision type determination routine illustrated in FIG. 5.

That is, the collision type determination routine illustrated in FIG. 5 may be, for example, started in a case where it is determined that there is a high probability that the front collision in any type has occurred at the vehicle 1. Specifically, such a routine may be started in a case where the third longitudinal deceleration acquired by the third acceleration acquiring unit 233 exceeds a predetermined value (e.g., 3 G), for example. In response to a change in the start timing, changes may be also made to the collision type determination routine illustrated in FIG. 5 as necessary.

The contents of the collision type determination routine illustrated in FIG. 5 are not limited to those of the above-described specific example. That is, changes may be made to the collision type determination routine illustrated in FIG. 5 as necessary. Specifically, step of clearing each stored value of the longitudinal decelerations and the lateral accelerations in a case where a state in which the third longitudinal deceleration is less than a predetermined value (e.g., 1.5 G) is continued for a predetermined period or longer may be added, for example.

FIG. 6 is one example where part of the collision type determination routine illustrated in FIG. 5 has been changed. In such a variation, step 508 in FIG. 5 is omitted. By such an example operation, it can be more quickly and accurately determined whether the collision type of the front collision is the oblique front collision, the low overlap front collision, the high overlap front collision, the pole collision, or the full overlap front collision.

Specifically, in a case where the initial value of the first lateral acceleration GyR and the initial value of the second lateral acceleration GyL are both equal to or greater than the pole determination threshold G_POL as the positive value (i.e., step 505=YES), the CPU temporarily ends the present routine after the processing of step 511 has been executed. At step 511, the CPU determines the pole collision as the collision type.

In the case of "NO" in determination at step 505, the CPU proceeds to step 506. At step 506, the CPU determines whether either one of the initial value of the first lateral acceleration GyR or the initial value of the second lateral acceleration GyL is equal to or greater than the low overlap determination threshold G_LL as the positive value or not.

In the case of "YES" in determination at step 506, it is, at step 507, further determined whether either one of the initial value of the first lateral acceleration GyR or the initial value of the second lateral acceleration GyL is equal to or greater than the oblique determination threshold G_OBL as the positive value greater than the low overlap determination threshold G_LL. According to the determination result of step 507, it is, as in the above-described specific example, further determined whether the collision type is the oblique front collision or the low overlap front collision.

In the case of "NO" in determination at step 506, the CPU proceeds to step 509. At step 509, the CPU determines whether the initial value of the first longitudinal deceleration GxR and the initial value of the second longitudinal deceleration GxL are both equal to or greater than the offset determination threshold G_OFS as the positive value or not.

There may be a case where the initial value of the first lateral acceleration GyR and the initial value of the second lateral acceleration GyL are both less than the low overlap determination threshold G_LL and the initial value of the first longitudinal deceleration GxR and the initial value of the second longitudinal deceleration GxL are both equal to or greater than the offset determination threshold G_OFF. In this case, determination at step 505 is "NO," determination at step 506 is "NO," and determination at step 509 is "YES." In this case, the CPU proceeds to step 514, and determines the full overlap front collision as the collision type.

There may be a case where the initial value of the first lateral acceleration GyR and the initial value of the second lateral acceleration GyL are both less than the low overlap determination threshold G_LL and either one of the initial value of the first longitudinal deceleration GxR or the initial value of the second longitudinal deceleration GxL is less than the offset determination threshold G_OFF. In this case, determination at step 505 is "NO," determination at step 506 is "NO," and determination at step 509 is "NO." In this case, the CPU proceeds to step 515, and determines the high overlap front collision as the collision type.

The step of determining whether the integrated value Dv of the third longitudinal deceleration exceeds a predetermined value Dv0 or not may be provided between step 502 and step 504. In such a variation, in a case where the integrated value Dv of the third longitudinal deceleration does not exceed the predetermined value Dv0, it is assumed that no front collision has occurred. Thus, in this case, the CPU temporarily ends the present routine. On the other hand, in a case where the integrated value Dv of the third longitudinal deceleration exceeds the predetermined value Dv0, it is assumed that the front collision in any type has occurred at the vehicle 1. Thus, in this case, the CPU proceeds to the step after step 504 for determining the collision type.

The range of the overlap ratio in, e.g., the "low overlap front collision" is not limited to that of the above-described specific example. Moreover, in the above-described embodiment, the collision determination device 230 determines whether the collision type is the pole collision, the oblique front collision, the low overlap front collision, the high overlap front collision, or the full overlap front collision. However, the present invention is not limited to such an aspect. That is, determination on at least any one of the pole collision, the oblique front collision, the low overlap front collision, or the high overlap front collision may be omitted, for example. Specifically, determination on the pole collision may be omitted, for example. Alternatively, the low overlap front collision and the high overlap front collision may be made common as the "offset front collision." In response to such a change, changes may be also made to the collision type determination routines illustrated in FIGS. 5 and 6 as necessary.

The phrase of "acquire" may be replaced with other terms such as "estimate," "detect," "sense," "calculate," "generate," and "receive" according to the contents, i.e., within a technically-consistent scope.

An inequality sign in each type of determination processing may be a sign with or without an equality sign. That is, "equal to or greater than the threshold" and "exceeding the threshold" may be replaced with each other. Similarly, "less than the threshold" and "equal to or less than the threshold" may be replaced with each other.

Unless otherwise clearly stated as essential and considered essential in principle, the elements forming the above-described embodiment are not necessarily essential, needless to say. Moreover, unless otherwise clearly stated as essential and clearly limited to a specific number in principle, the present invention is not limited to such a specific number in a case where numerical values such as the numbers, numerical values, quantities, and ranges of the components are mentioned. Similarly, unless otherwise clearly stated as essential and clearly limited to specific shape, direction, position relationship, etc. in principle, the present invention is not limited to such shape, direction, position relationship, etc. in a case where the shapes, directions, position relationships, etc. of the components are mentioned.

The variations are not limited to the above-described examples. Moreover, multiple variations may be combined together. Further, part or the entirety of the above-described embodiment and part or the entirety of the variations may be combined together.

What is claimed is:

1. A collision determination device for determining a type of front collision of a vehicle, comprising:
   a non-transitory memory storing one or more computer programs; and
   a processor executing the one or more programs to:
   acquire, based on output of a first acceleration sensor arranged at a front portion of the vehicle on one side in a vehicle width direction with respect to a vehicle center line, a first longitudinal deceleration as a deceleration in a vehicle length direction parallel with the vehicle center line and a first lateral acceleration as an acceleration in the vehicle width direction, the first lateral acceleration taking an acceleration in an inward direction toward the vehicle center line as a positive value and taking an acceleration in an outward direction opposite to the inward direction as a negative value, the first acceleration sensor being fixed to one of a pair of side members or to a member of the vehicle to which impact of the collision is to be transferred from the one of the pair of side members, the pair of side members extending symmetrically across the vehicle center line from a reinforcement member arranged inside a front bumper of the vehicle and curved forward in a raised shape when viewed in plan view;
   acquire, based on output of a second acceleration sensor arranged at the front portion of the vehicle on the other side in the vehicle width direction with respect to the vehicle center line, a second longitudinal deceleration as a deceleration in the vehicle length direction and a second lateral acceleration as an acceleration in the vehicle width direction, the second lateral acceleration taking an acceleration in the inward direction as a positive value and taking an acceleration in the outward direction as a negative value, the second acceleration sensor being fixed to an other of the pair of side members or to a member of the vehicle to which impact of the collision is to be transferred from the other of the pair of side members;

determine a collision type based on the first longitudinal deceleration and the first lateral acceleration acquired and the second longitudinal deceleration and the second lateral acceleration acquired; and operate a protection device according to the determined collision type, wherein the processor determines that the collision type is a full overlap front collision as a collision of the vehicle with an obstacle across substantially an entire width of a front surface of a vehicle body in a case where initial values as values at an early phase of the collision for the first lateral acceleration and the second lateral acceleration are both less than a full overlap determination threshold as a negative value.

2. The collision determination device according to claim 1, wherein the processor further executes the one or more programs to determine that the collision type is an oblique front collision as a front collision of a corner portion of the front portion of the vehicle body with an inclined surface standing with inclination with respect to the vehicle width direction in a case where either one of the initial value of the first lateral acceleration or the initial value of the second lateral acceleration is equal to or greater than an oblique determination threshold as a positive value.

3. The collision determination device according to claim 2, wherein the processor further executes the one or more programs to determine that the collision type is a low overlap front collision as an offset front collision with an overlap ratio of equal to or lower than a predetermined value in a case where the either one of the initial value of the first lateral acceleration or the initial value of the second lateral acceleration is equal to or greater than a low overlap determination threshold as a positive value and less than the oblique determination threshold.

4. The collision determination device according to claim 3, wherein the processor further executes the one or more programs to determine that the collision type is a high overlap front collision as the offset front collision with a higher overlap ratio than that of the low overlap front collision as the offset front collision with the overlap ratio of equal to or lower than the predetermined value in a case where the initial value of the first lateral acceleration and the initial value of the second lateral acceleration are both less than the low overlap determination threshold as the positive value and either one of an initial value of the first longitudinal deceleration or an initial value of the second longitudinal deceleration is less than an offset determination threshold as a positive value.

5. The collision determination device according to claim 4, wherein the processor further executes the one or more programs to determine that the collision type is the full overlap front collision in a case where the initial value of the first lateral acceleration and the initial value of the second lateral acceleration are both less than the low overlap determination threshold and the initial value of the first longitudinal deceleration and the initial value of the second longitudinal deceleration are both equal to or greater than the offset determination threshold.

6. The collision determination device according to claim 1, wherein the processor further executes the one or more programs to determine that the collision type is a pole collision as a front collision of a pole-shaped obstacle with a middle portion of the front surface of the vehicle body in the vehicle width direction in a case where the initial value of the first lateral acceleration and the initial value of the second lateral acceleration are both equal to or greater than a pole determination threshold as a positive value.

7. The collision determination device according to claim 1, wherein the processor further executes the one or more programs to acquire a third longitudinal deceleration as a deceleration in the vehicle length direction, wherein the processor further executes the one or more programs to determine the collision type based on a threshold varying according to a value of a first axis and a value of a second axis in a case where an integrated value of the third longitudinal deceleration is represented at the first axis and any one of the first longitudinal deceleration, the first lateral acceleration, the second longitudinal deceleration, or the second lateral acceleration is represented at the second axis.

8. The collision determination device according to claim 1, wherein the initial values comprise an initial value of each of the first lateral acceleration and the second lateral acceleration.

9. A collision determination device for determining a type of front collision of a vehicle, comprising:

a non-transitory memory storing one or more computer programs; and a processor executing the one or more programs to:

acquire, based on output of a first acceleration sensor arranged at a front portion of the vehicle on one side in a vehicle width direction with respect to a vehicle center line, a first longitudinal deceleration as a deceleration in a vehicle length direction parallel with the vehicle center line and a first lateral acceleration as an acceleration in the vehicle width direction, the first lateral acceleration taking an acceleration in an inward direction toward the vehicle center line as a positive value and taking an acceleration in an outward direction opposite to the inward direction as a negative value, the first acceleration sensor being fixed to one of a pair of side members or to a member of the vehicle to which impact of the collision is to be transferred from the one of the pair of side members, the pair of side members extending symmetrically across the vehicle center line from a reinforcement member arranged inside a front bumper of the vehicle and curved forward in a raised shape when viewed in plan view;

acquire, based on output of a second acceleration sensor arranged at the front portion of the vehicle on the other side in the vehicle width direction with respect to the vehicle center line, a second longitudinal deceleration as a deceleration in the vehicle length direction and a second lateral acceleration as an acceleration in the vehicle width direction, the second lateral acceleration taking an acceleration in the inward direction as a positive value and taking an acceleration in the outward direction as a negative value, the second acceleration sensor being fixed to an other of the pair of side members or to a member of the vehicle to which impact of the collision is to be transferred from the other of the pair of side members;

determine a collision type based on the first longitudinal deceleration and the first lateral acceleration acquired and the second longitudinal deceleration and the second lateral acceleration acquired; and operate a protection device according to the determined collision type, wherein the processor determines that the collision type is full overlap front collision as collision of the vehicle with an obstacle across substantially an entire width of a front surface of a vehicle body in a case where initial values as values at an early phase of the collision for the first lateral acceleration and the second lateral acceleration are both less than a low overlap determination threshold as a positive value and an initial value of the first longitudinal deceleration and an initial value of the second longitudinal deceleration are both equal to or greater than an offset determination threshold as a positive value.

10. The collision determination device according to claim 9, wherein the processor further executes the one or more programs to determine that the collision type is a high overlap front collision as an offset front collision with a higher overlap ratio than that of a low overlap front collision as the offset front collision with the overlap ratio of equal to or lower than a predetermined value in a case where the initial value of the first lateral acceleration and the initial value of the second lateral acceleration are both less than the low overlap determination threshold and either one of an initial value of the first longitudinal deceleration or an initial value of the second longitudinal deceleration is less than an offset determination threshold.

11. The collision determination device according to claim 9, wherein the processor further executes the one or more programs to determine that the collision type is an oblique front collision as front collision of a corner portion of the front surface of the vehicle body with an inclined surface standing with inclination with respect to the vehicle width direction in a case where either one of the initial value of the first lateral acceleration or the initial value of the second lateral acceleration is equal to or greater than an oblique determination threshold as a positive value.

12. The collision determination device according to claim 11, wherein the processor further executes the one or more programs to determine that the collision type is a low overlap front collision as an offset front collision with an overlap ratio of equal to or lower than a predetermined value in a case where the either one of the initial value of the first lateral acceleration or the initial value of the second lateral acceleration is equal to or greater than the low overlap determination threshold and less than the oblique determination threshold.

13. The collision determination device according to claim 9, wherein the processor further executes the one or more programs to determine that the collision type is a pole collision as a front collision of a pole-shaped obstacle with a middle portion of the front surface of the vehicle body in the vehicle width direction in a case where the initial value of the first lateral acceleration and the initial value of the second lateral acceleration are both equal to or greater than a pole determination threshold as a positive value.

* * * * *